March 14, 1950  O. E. SZEKELY  2,500,216
GENERATOR DRIVE

Filed June 4, 1948  5 Sheets-Sheet 1

INVENTOR.
OTTO E. SZEKELY
BY
ATTORNEYS

March 14, 1950 O. E. SZEKELY 2,500,216
GENERATOR DRIVE

Filed June 4, 1948 5 Sheets-Sheet 3

INVENTOR.
OTTO E. SZEKELY
BY

ATTORNEYS

March 14, 1950     O. E. SZEKELY     2,500,216
GENERATOR DRIVE

Filed June 4, 1948     5 Sheets-Sheet 4

INVENTOR.
OTTO E. SZEKELY
BY
ATTORNEYS

March 14, 1950 O. E. SZEKELY 2,500,216
GENERATOR DRIVE
Filed June 4, 1948 5 Sheets-Sheet 5
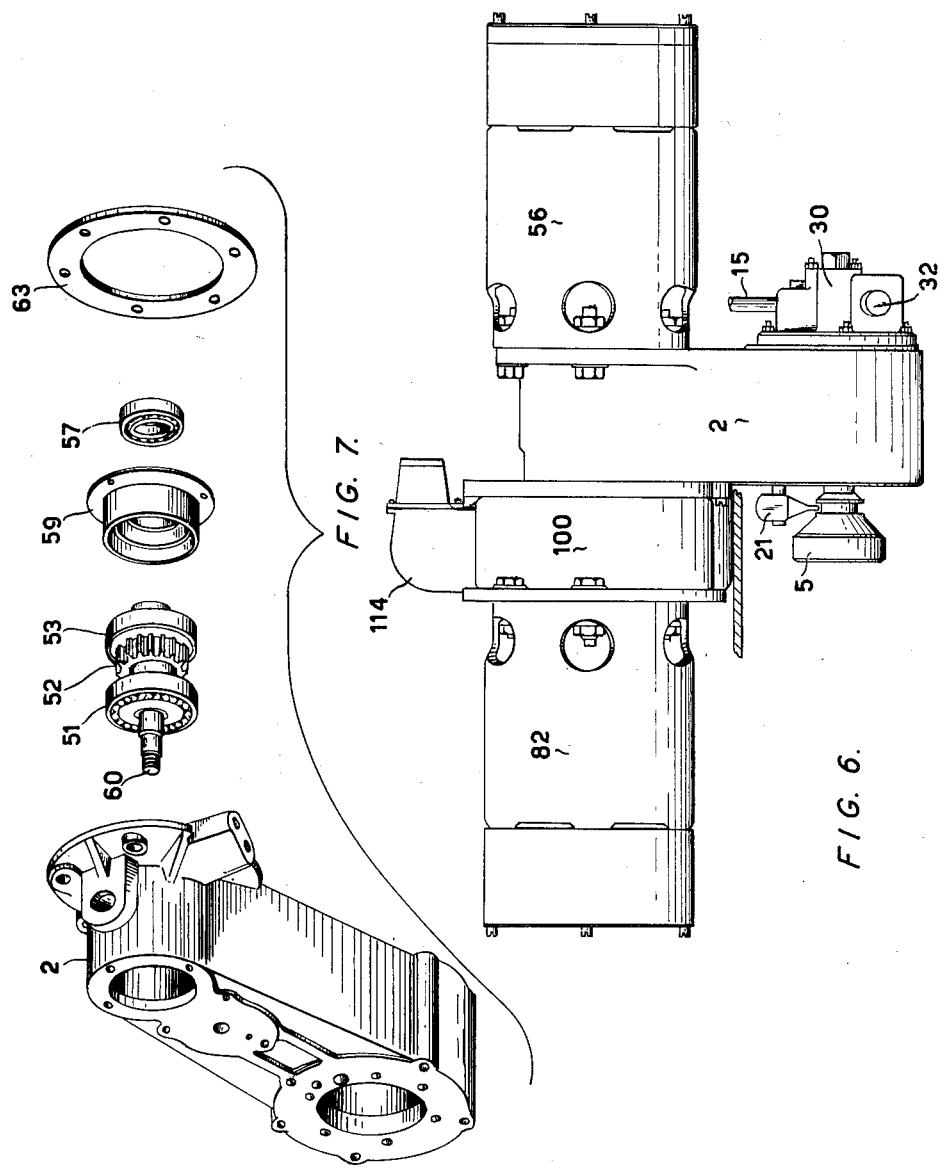
INVENTOR.
OTTO E. SZEKELY
BY
ATTORNEYS Patented Mar. 14, 1950

2,500,216

UNITED STATES PATENT OFFICE 2,500,216

GENERATOR DRIVE

Otto E. Szekely, Philadelphia, Pa., assignor to Otto E. Szekely, Gaston Dorian, and Frank R. Maxwell, copartners doing business as O. E. Szekely & Associates, Philadelphia, Pa.

Application June 4, 1948, Serial No. 31,062

8 Claims. (Cl. 171—252)

This invention relates to a method of mounting and driving one or more auxiliary generators and other auxiliary equipment on a line maintenance jeep. A line maintenance jeep is a standard Army 4 x 4, ¼ ton truck (jeep) which has been converted into an auxiliary low voltage power supply unit, supplying either alternating current or direct current or both as auxiliary power supply for aircraft as may be required for starting engines and the like.

One of the objects of this invention is to provide a housing which may be bolted to the rear end of the transfer case of the jeep transmission. The housing encloses the drive mechanism which transmits rotary mechanical power from the spur gear in the transfer case to one or two generators, and a generator cooling fan mounted on the housing. The housing, generators and cooling fan are so mounted and arranged as to fit between the two front seats and not obstruct the normal operation of the jeep by the driver.

Another object of this invention is to transmit rotary mechanical power from the spur gear in the transfer case of the jeep to the armature shaft of the generator or generators and cooling fan and to accomplish this in a limited space and yet have a drive so adapted and arranged to provide accessibility and ease of maintenance service to its component parts.

A further object of this invention is to provide a drive and mounting for generators which may be engaged with a spur gear in the jeep transfer case by a manual clutch operation.

A further object of this invention is to provide a drive and mounting for generators which will drive a governor which governs the engine speed at approximately 2650 R. P. M., a tachometer mounted in the jeep dashboard, a direct current generator driven at approximately 5300 R. P. M. and an alternating current generator driven at approximately 3600 R. P. M.

A further object of the invention is to provide a series of component drive assemblies which may be readily assembled to provide various mountings of alternating current generators to a basic direct current generator drive assembly.

These and other objects of the invention particularly relating to details of construction and operation will become apparent from the following description, read in conjunction with the accompanying drawings in which:

Figure 6 is a side elevation to show the generator drive housing, a fan housing and two generators mounted in line; and Figure 7 is a perspective view of the housing and an exploded view of the upper direct current generator drive mechanism.

Figure 1:
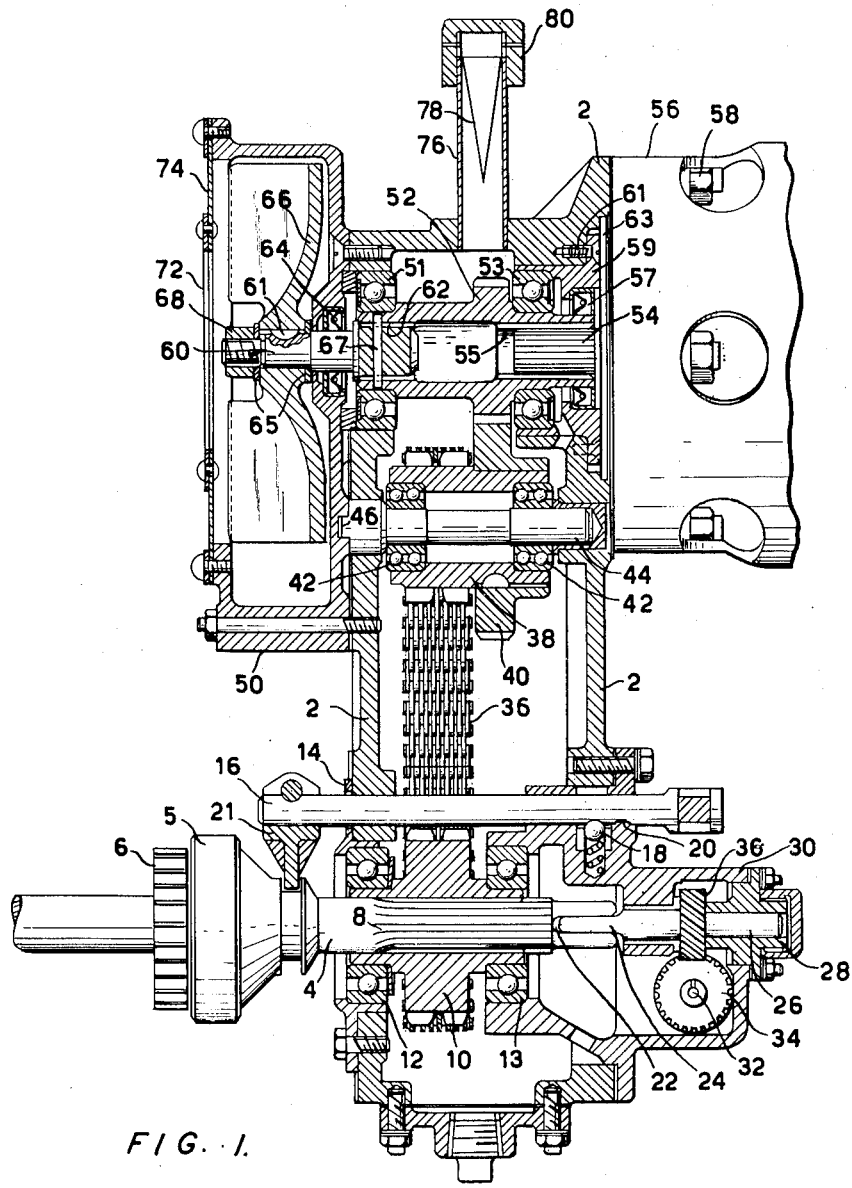
Figure 1 is a side elevation, in section, to show the generator drive arrangement and housing mounting one generator.
Figure 4:
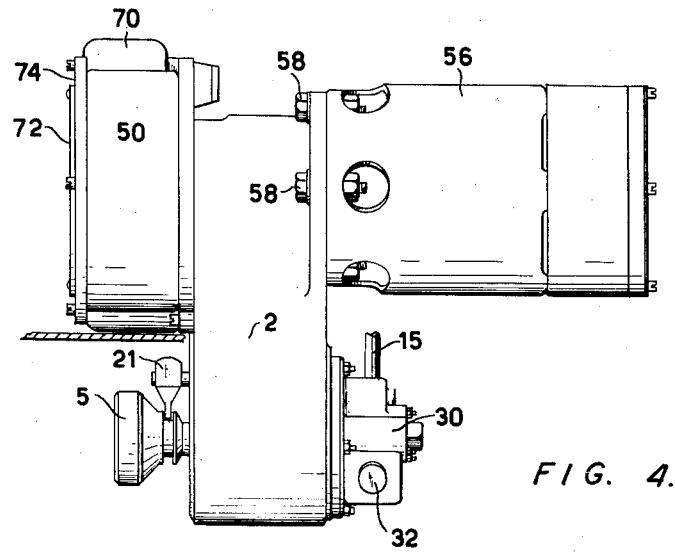
Figure 4 is a side elevation to show the generator drive housing, fan housing and generator.

Figures 1 and 4 show the drive assembly for a single direct current generator which consists of a housing 2 containing a lower drive shaft 4, on one end of which is formed with a bell 5 containing internal gears for engagement with the spur gear 6 within the jeep transfer case. The drive shaft 4 is cut with splines 8 sliding within spline grooves in sprocket gear 10. The sprocket gear 10 is mounted between bearings 12 and 13, the bearing adjacent to the jeep transfer case having an oil slinger ring 14 to minimize lubrication leakage out of the drive housing. When the clutch shaft 16 is in the position as shown, the main drive shaft is disengaged from the spur gear in the jeep transfer case. When the clutch handle 15 moves the clutch shaft 16 to the position at which the ball 18 will seat in the recess 20, the shift fork 21 will move the drive shaft 4 longitudinally a sufficient distance to engage the internal gear in the bell 5 with the spur gear 6 in the jeep transfer case.

The end of drive shaft 4 away from the jeep transfer case is cut with a slot 22 to receive the key-cut end 24 of the tachometer drive shaft 26 which runs in bushing 28 mounted in housing 30. Also mounted in housing 30 is cross shaft 32 supporting and keyed to gear 34 which is driven by gear 36 keyed to shaft 26. The two ends of shaft 32 extending outside of housing 30 provide shafts connectable with a governor, not shown, to control the jeep motor speed and a tachometer, not shown, to indicate the jeep motor speed. The main drive shaft 4, sprocket gear 10 and the other mechanism thus far described constitute the lower drive assembly.

The sprocket 10 drives the chain 36 which, in turn, drives upper chain sprocket 38 to which is keyed spur gear 40. The sprocket gear 38 is mounted on bearings 42 which run on shaft 44.

The shaft is mounted in housing 2 and is prevented from rotating by a key-cut end 46 which is inserted in and locked by the fan housing 50. Spur gear 40 drives spur gear 52 which is mounted on bearings 51 and 53. Into gear 53 is cut an internal spline 55 to receive the splined D. C. generator drive shaft 54. The oil seal 57 prevents the passage of a gear lubricant into the case of the D. C. generator 56. Bearing 53 is mounted in bearing support cap 59 which is held in position by screws 61 and covered by gasket 63 as shown in exploded relation in Figure 7. The D. C. generator 56 is mounted to the housing 2 by bolts 58 as shown in Figure 4. This portion of the drive assembly is referred to as the upper drive assembly for driving the D. C. generator.

The end of spur gear 52 opposite the D. C. generator is cut with an internal spline 62 and receives fan shaft 60 as a push fit within the internal spline 62. The shaft 60 and gear 52 are pinned together with pin 67. There is then disposed on the shaft an oil seal 64, washers 65 and fan 66. The fan, keyed to shaft 60 by key 61, is held in place by nut 68, runs in fan housing 50 and forces a circulation of cooling air through an external air duct 70 partially shown in Figure 4 to the generator 56. A screen 72 is provided over the air inlet opening in the fan housing cover plate 74 to prevent the entrance of foreign objects. There is also provided a breather pipe 76 which encloses screen 78 and is covered by cap 80. The breather pipe may also serve as a lubrication fill pipe.

Figure 2:
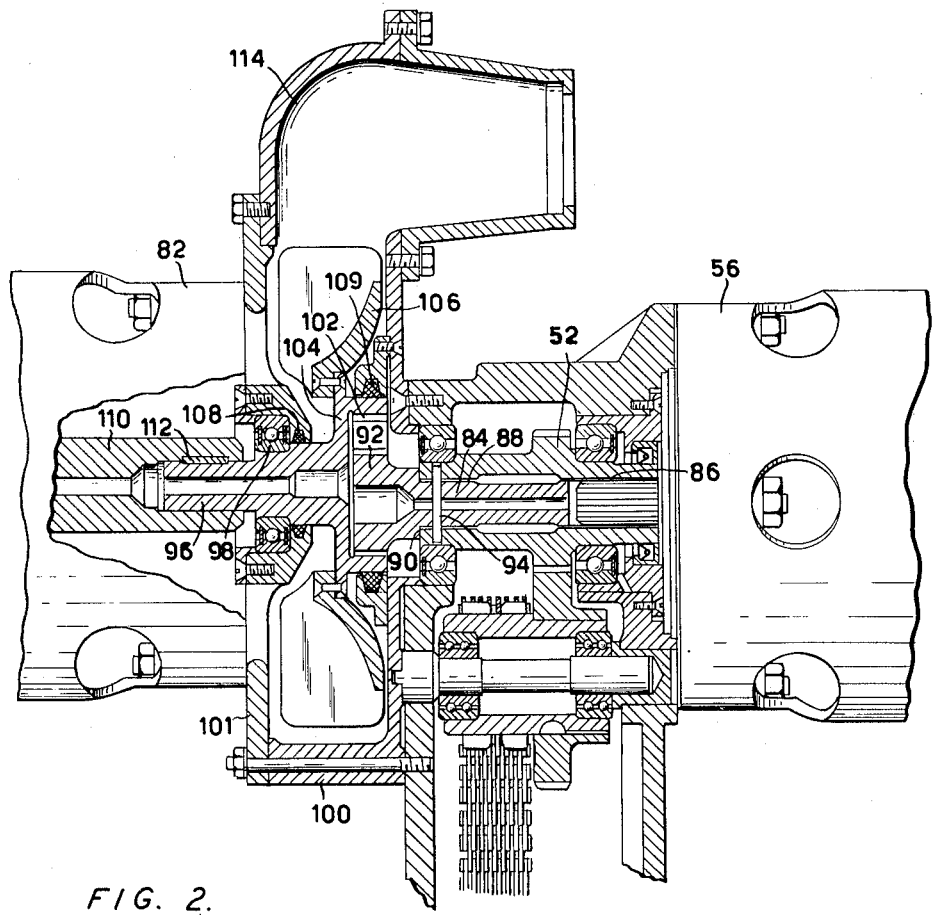
Figure 2 is a side elevation, in section, to show the generator drive arrangement and housing mounting two generators in line.

Figures 2 and 6 show a housing and drive mechanism employed when two generators are mounted in line. These generators, a D. C. generator 56 and an A. C. generator 82, are driven at dissimilar speeds. In this arrangement, the lower drive mechanism and the upper drive mechanism for the D. C. generator are identical to those heretofore described in connection with Figure 1. The fan drive mechanism and the fan housing, however, are changed. Shaft 84 is cut with splined sections 86 and 88, a shoulder 90 and spur gear 92. This shaft is pinned into position in spur gear 52 with pin 94. The shaft 96, supported by bearing 98 mounted in cover 101 of the fan housing 100, is formed at one end with the internal spur gear 102 and flange 104 which mounts fan 106. The fan forces a supply of cooling air through duct 114 partially shown in Figure 6 to the D. C. generator. The internal spur gear 102 meshes with external spur gear 92. The difference in the number of teeth on these two gears is in inverse proportion to the difference in speed of operation of the D. C. generator 56 and the A. C. generator 82. The oil seal 108 prevents lubrication from the bearing 98 working along the shaft 96 and entering the fan housing. The oil seal 109 prevents lubrication from entering the fan housing from the upper drive assembly. The rotor shaft 110 of the A. C. generator 82 has a bore at one end to receive the shaft 96. The two shafts are keyed together with key 112.

Figure 3:
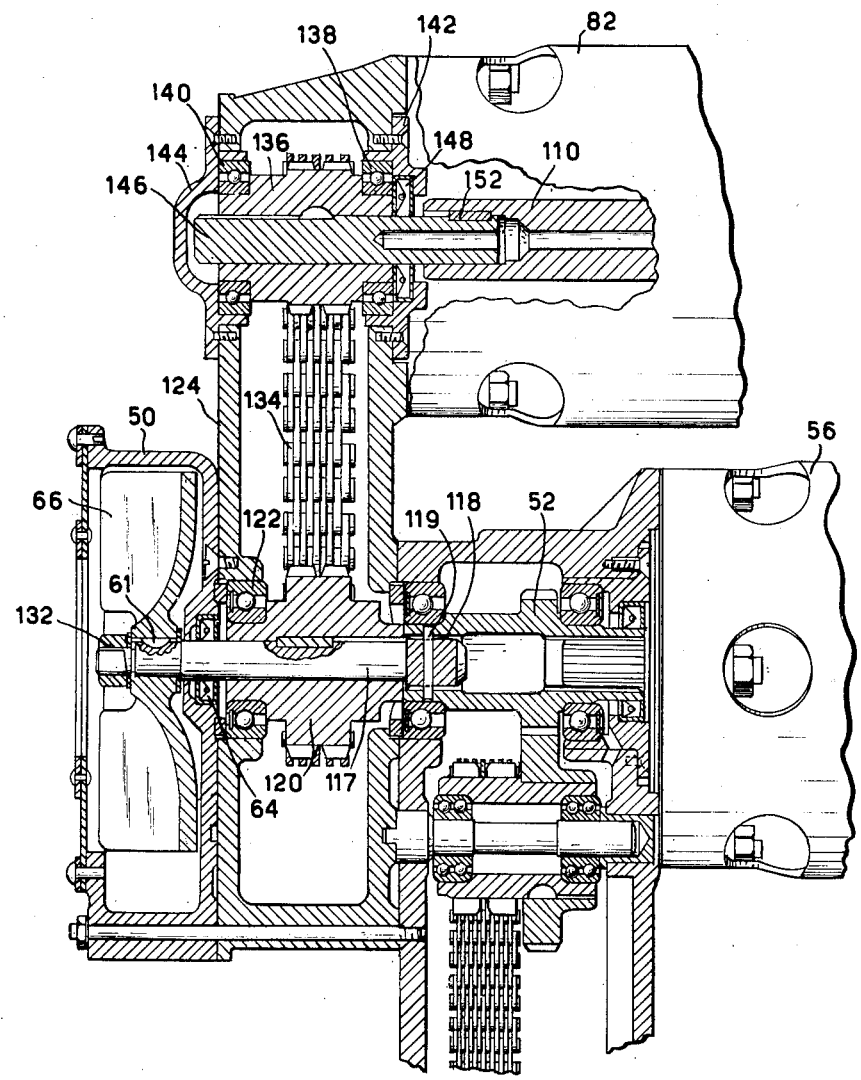
Figure 3 is a side elevation, in section, to show the generator drive arrangement and housings mounting two generators, one above the other.
Figure 5:
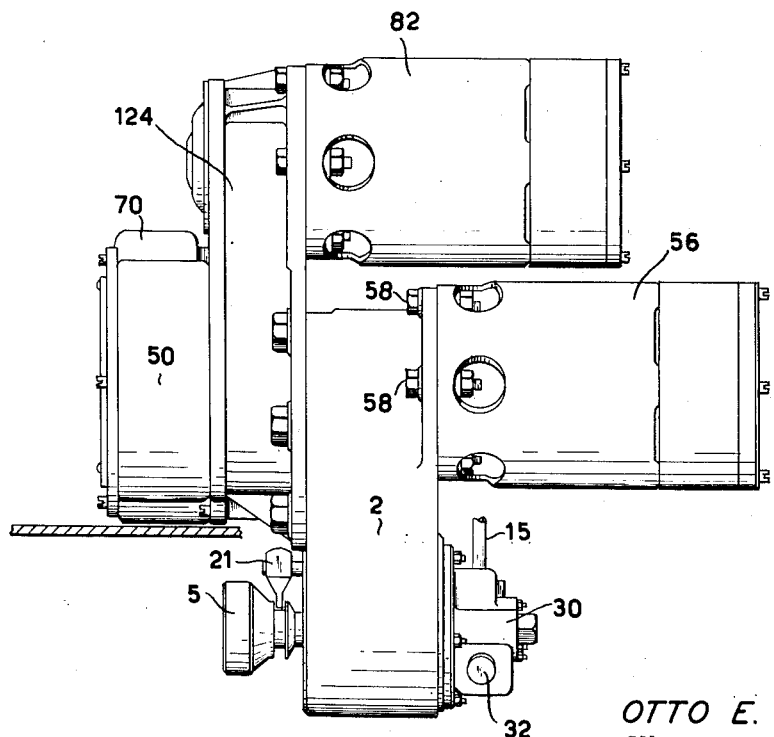
Figure 5 is a side elevation to show generator drive housings, the fan housing and two generators mounted one above the other.

Figures 3 and 5 show the arrangement when the A. C. generator 82 is mounted above the direct current generator 56. In this arrangement the lower drive mechanism and the upper drive mechanism for the D. C. generator and the fan housing are identical to those described in connection with Figure 1. The fan drive shaft is changed and the A. C. generator drive housing is installed. The shaft 117 is cut with spline 118 at one end to mesh with the internal spline in gear 52. The gear and the shaft are pinned together with pin 119. Keyed to shaft 117 is sprocket gear 120 supported by bearing 122 mounted in A. C. generator drive housing 124. Shaft 117 extends through oil seal 64 and fan housing 50 and is keyed to fan 66 which is held into position on shaft 118 by nut 132. This fan and housing assembly is identical to the assembly disclosed in connection with the single generator drive in Figure 1 and as before serves to force a circulation of cooling air to the D. C. generator.

The sprocket gear 120 drives the chain 134 which, in turn, drives the upper sprocket gear 136. Upper sprocket gear 136 mounted on bearings 138 and 140 retained in caps 142 and 144, respectively, is keyed to shaft 146. Oil seal 148 prevents lubrication from passing into the housing of the A. C. generator 82. The shaft 146 slides into a bored-out portion of generator rotor shaft 110 and is keyed thereto by key 152.

To review briefly some of the features of this device:

Referring to the single generator drive arrangement shown in Figures 1, 4 and 7, it can be seen that the lower drive assembly, including the tachometer drive assembly, bearings 12 and 13, and sprocket 10, can be readily disassembled by the removal of housing 30 following the separation of clutch shaft 16 and fork 21.

The upper D. C. generator drive mechanism is accessible with the removal of the D. C. generator and can be disassembled as shown in the exploded view in Figure 7 thus providing facility of maintenance to this portion of the drive.

The arrangement of two generators in line shown in Figures 2 and 6 employs the same lower drive assembly, housing 2 and upper D. C. generator drive and D. C. generator 56 as does the single generator drive arrangement. By replacing the fan housing 50 and fan shaft assemblies with the housing 100 and associated parts, the A. C. generator and its drive assembly are easily installed.

The alternate arrangement of a two generator assembly as shown in Figures 3 and 5 merely requires the insertion, into the arrangement shown in Figure 1, of the upper A. C. generator drive and housing 124 between the D. C. generator drive and housing 2 and the fan housing 50 and the replacement of fan shaft 60 as shown in Figure 1 with the fan shaft 117 as shown in Figure 3.

In this latter arrangement, the upper A. C. generator drive consisting of sprocket 136, bearings 138 and 140 and shaft 146 are entirely accessible by the removal of cap 144 or by the removal of the A. C. generator 82 and cap 142.

What I claim and desire to protect by Letters Patent is:

1. A power take-off device between driving means and a device to be driven, comprising a main housing having parallel sides, a driving shaft, there being an opening in each side of the housing, a bearing support in each opening, a bearing mounted in each support, a sprocket wheel slidably splined to the driving shaft rotatably mounted in said bearings, one of the openings in which a support is mounted being of greater diameter than the diameter of the sprocket wheel, one end of the driving shaft extending through the bearing in the other support, a driving member on said end of the shaft, means for shifting the shaft endwise, there being an opening in each side of the housing above the driving shaft, a bearing support mounted in one of said openings, a bearing mounted in said support, a bearing mounted in the other opening, a hollow gear wheel rotatably mounted in said bearings, said hollow gear being provided with means for connecting a shaft thereto extending from a device to be driven, the diameter of the opening in which said bearing support is mounted being greater than the diameter of the gear wheel, a non-rotatable shaft mounted in the sides of the housing between said gear wheel and the driving shaft, a gear wheel rotatably mounted on the said shaft meshing with the hollow gear, a sprocket wheel connected to gear wheel on the shaft, and a sprocket chain connecting the sprocket wheels.

2. A power take-off device in accordance with claim 1, characterized in that the means for shifting the driving shaft endwise, comprises means for disconnecting the shifting means from the driving shaft, to permit the driving shaft to be withdrawn from the sprocket wheel, and when the support in the opening of greater diameter than the sprocket wheel is removed from the housing, the chain can be removed from the sprocket wheel, and the sprocket wheel, together with the bearings, may be withdrawn through said opening.

3. A power take-off device in accordance with claim 1, characterized in that the fixed shaft may be withdrawn from the housing while holding the assembled gear wheel and sprocket together with the bearings, and after the shaft is withdrawn the said assembled parts may be withdrawn through the opening through which the sprocket on the driving shaft was withdrawn, the hollow gear wheel, together with the bearings therefor, may then be withdrawn through the opening in the housing of greater diameter than the hollow gear together with the bearing support.

4. A power take-off device in accordance with claim 1, characterized in that the bearing support mounted in the opening of greater diameter than the sprocket wheel on the driving shaft, is provided with a bearing in axial alignment with the axis of the driving shaft, a shaft having one end rotatably mounted in said bearing, the other end of the shaft being engaged by a fork on the end of the driving shaft, a helical gear on said shaft meshing with a similar gear secured to a shaft extending at right angles thereto, rotatably mounted in said bearing support, said last mentioned shaft extending beyond the support, and means on each end of said last mentioned shaft for connecting a flexible driving shaft thereto.

5. A power take-off device in accordance with claim 1, characterized in that a D. C. generator is demountably connected to one side of the housing, said generator having a shaft in line with the axis of the hollow gear wheel, means for removably connecting the shaft of the generator to the hollow gear, a fan housing demountably supported from the other side of the housing, a fan driving shaft removably connected to the other end of the hollow gear wheel, and a fan within the fan housing adapted to be driven by said fan shaft.

6. A power take-off device between driving means and a device to be driven comprising a main housing having parallel sides, a driving shaft, there being an opening in each side of the housing, a bearing support in each opening, ball bearings mounted in each support, a sprocket wheel slidably splined to the driving shaft having hubs mounted in said bearings, at least one of the openings in which a support is mounted being of greater diameter than the diameter of the sprocket wheel, one end of the driving shaft extending through one of the bearing supports, a driving member on said end of the shaft, means for shifting the shaft endwise, there being an opening in each side of the housing above the driving shaft, a bearing support mounted in one of said openings, ball bearings mounted in said support and in the other opening, a hollow gear wheel having hubs mounted in said bearings, said hollow gear being provided with means for connecting a shaft thereto extending from a device to be driven, the diameter of the opening in which said bearing support is mounted being greater than the diameter of the hollow gear wheel, a non-rotatable shaft mounted in the sides of the housing between said gear wheel and the driving shaft, a gear wheel rotatably mounted on the said shaft meshing with the hollow gear, a sprocket wheel connected to gear wheel on the shaft, and a sprocket chain connecting the sprocket wheels, the arrangement being such that the first mentioned sprocket wheel as well as the hollow gear wheel together with the ball bearings are removable through the openings for the bearing supports.

7. A power take-off device between driving means and a device to be driven comprising a main housing, a driving shaft, a pair of bearings mounted in oppositely disposed openings in the housing, a sprocket wheel slidably splined to the driving shaft and rotatably mounted in said bearings, one of said openings being of greater diameter than the sprocket wheel and one end of said shaft extending through one of the bearings to a point exterior the housing, means for shifting the shaft endwise and engaging it with driving means, a second pair of bearings mounted in openings in the housing, a gear rotatably mounted in said bearings, means to connect a shaft from a device to be driven to the center of said gear, one of the openings in which the second pair of bearings is mounted having a diameter greater than that of said gear, a second gear meshing with said first mentioned gear, a second sprocket connected to the second gear, a chain connecting the sprockets, said second sprocket and said second gear being mounted for rotation between the driving shaft and the first mentioned gear.

8. A power take-off device in accordance with claim 7, characterized in that a generator is demountably connected to one side of the housing, said generator having a shaft removably connected to the center of the first mentioned gear, a fan housing demountably supported from the other side of the housing, a fan driving shaft removably connected to the other end of the first mentioned gear, and a fan within the fan housing adapted to be driven by said fan shaft.

OTTO E. SZEKELY.

No references cited.